US007622711B2

(12) United States Patent
Wildgoose et al.

(10) Patent No.: US 7,622,711 B2
(45) Date of Patent: Nov. 24, 2009

(54) MASS SPECTROMETER

(75) Inventors: Jason Lee Wildgoose, Stockport (GB); Steven Derek Pringle, Darwen (GB); Kevin Giles, Stockport (GB); Robert Harold Bateman, Knutsford (GB)

(73) Assignee: Micromass UK Limited, Manchester (GB)

(*) Notice: Subject to any disclaimer, the term of this patent is extended or adjusted under 35 U.S.C. 154(b) by 151 days.

(21) Appl. No.: 11/574,554

(22) PCT Filed: Sep. 14, 2005

(86) PCT No.: PCT/GB2005/003543

§ 371 (c)(1),
(2), (4) Date: Aug. 17, 2007

(87) PCT Pub. No.: WO2006/030205

PCT Pub. Date: Mar. 23, 2006

(65) Prior Publication Data

US 2008/0135746 A1 Jun. 12, 2008

Related U.S. Application Data

(60) Provisional application No. 60/611,636, filed on Sep. 21, 2004.

(30) Foreign Application Priority Data

Sep. 14, 2004 (GB) ................................ 0420408.7

(51) Int. Cl.
*B01D 59/44* (2006.01)

(52) U.S. Cl. ....................... 250/283; 250/281; 250/282; 250/286; 250/287; 250/290

(58) Field of Classification Search ................ 250/281, 250/282, 283, 286, 287, 288, 290, 291, 292, 250/293
See application file for complete search history.

(56) References Cited

U.S. PATENT DOCUMENTS 4,214,160 A * 7/1980 Fies et al. .................. 250/292

(Continued)

FOREIGN PATENT DOCUMENTS

GB 2382919 6/2003

(Continued)

OTHER PUBLICATIONS

Eng, JK, McCormack, AL and Yates, Jr., III, An Approach to Correlate Tandem Mass Spectral Data Of Peptides With Amino Acid Sequences In A Protein Database, J. Am. Soc. Mass Spectrum, 5(11) 976-89 (1994).

(Continued)

*Primary Examiner*—David A Vanore
*Assistant Examiner*—Michael Maskell
(74) *Attorney, Agent, or Firm*—Jamie H. Rose

(57) ABSTRACT

A mass spectrometer is disclosed comprising an ion mobility spectrometer or separator (3) arranged upstream of a collision or fragmentation cell (5). Ions are separated according to their ion mobility within the ion mobility spectrometer or separator (3). The kinetic energy of the ions exiting the ion mobility spectrometer or separator (3) is increased substantially linearly with time in order to optimize the fragmentation energy of ions as they enter the collision or fragmentation cell (5).

46 Claims, 4 Drawing Sheets

U.S. PATENT DOCUMENTS

| | | | | |
|---|---|---|---|---|
| 6,512,226 | B1 * | 1/2003 | Loboda et al. | 250/292 |
| 2002/0113207 | A1 * | 8/2002 | Lee et al. | 250/288 |
| 2002/0175278 | A1 * | 11/2002 | Whitehouse | 250/281 |
| 2002/0195555 | A1 * | 12/2002 | Weinberger et al. | 250/281 |
| 2003/0001084 | A1 * | 1/2003 | Bateman et al. | 250/281 |
| 2003/0001087 | A1 * | 1/2003 | Fuhrer et al. | 250/287 |
| 2004/0031920 | A1 * | 2/2004 | Giles et al. | 250/287 |
| 2006/0151689 | A1 * | 7/2006 | Bateman | 250/288 |

FOREIGN PATENT DOCUMENTS

| | | |
|---|---|---|
| GB | 2389704 | 12/2003 |
| GB | 2391699 | 2/2004 |
| GB | 2392006 | 2/2004 |
| GB | 2409764 | 7/2005 |

OTHER PUBLICATIONS

Bluggel M. et al, Paula—A 128 CPU Cluster for Peptide Fragmentation Fingerprint (PFF) Analysis, available at http://www-cs-faculty.stanford.edu/~knuth/news.html.

TurboSEQUEST, Rapid Protein Identification Software, Thermo Finnigan available at http://swehsc.pharmacy.arizona.edu/analysis/TurboSequest.pdf.

* cited by examiner

MASS SPECTROMETER

CROSS REFERENCE TO RELATED APPLICATIONS

This application is the National Stage of International Application No. PCT/GB2005/003543, filed on Sep. 14, 2005, which claims priority to and benefit of U.S. Provisional Patent Application Ser. No. 60/611,636 filed on Sep. 21, 2004, and priority to and benefit of United Kingdom Application No. 04 20408, filed Sep. 14, 2004. The entire contents of these applications are incorporated herein by reference.

The present invention relates to a mass spectrometer and a method of mass spectrometry.

The majority of conventional hybrid quadrupole Time of Flight mass spectrometers comprise a quadrupole mass filter, a fragmentation cell arranged downstream of the quadrupole mass filter and a Time of Flight mass analyser arranged downstream of the fragmentation cell. The mass spectrometer is conventionally used for Data Directed Analysis (DDA) type experiments wherein a candidate parent or precursor ion is identified by interrogation of a Time of Flight (TOF) data set. Parent or precursor ions having a specific mass to charge ratio are then arranged to be selectively transmitted by the quadrupole mass filter whilst other ions are substantially attenuated by the mass filter. The selected parent or precursor ions transmitted by the quadrupole mass filter are transmitted to the fragmentation cell and are caused to fragment into fragment or daughter ions. The fragment or daughter ions are then mass analysed and mass analysis of the fragment or daughter ions yields further structural information about the parent or precursor ions.

The fragmentation of parent or precursor ions is commonly achieved by a process known as Collisional Induced Dissociation ("CID"). Ions are accelerated into the fragmentation cell and are caused to fragment upon colliding energetically with collision gas maintained within the fragmentation cell. Once sufficient fragment ion mass spectral data has been acquired, the mass filter may then be set to select different parent or precursor ions having different mass to charge ratios. The process may then be repeated multiple times. It will be appreciated that this approach can lead to a reduction in the overall experimental duty cycle.

It is known to increase the experimental duty cycle by not performing the step of selecting parent or precursor ions having a specific mass to charge ratio. Instead, the known method repeatedly switches a collision or fragmentation cell back and forth between a fragmentation mode of operation and a non-fragmentation mode of operation without selecting specific parent or precursor ions.

The known approach ideally yields a first data set relating just to precursor or parent ions (in the non-fragmentation mode of operation) and a second data set relating just to fragment ions (in the fragmentation mode of operation). Software algorithms may be used to match individual parent or precursor ions observed in the parent ion mass spectrum with corresponding fragment ions observed in a fragment ion mass spectrum. The known approach is essentially a parallel process unlike the previously described serial process and can result in a corresponding increase in the overall experimental duty cycle.

A problem associated with the known approach is that the precursor or parent ions which are simultaneously fragmented in the fragmentation mode of operation are not specific and hence a wide range of ions having different mass to charge ratios and charge states will be attempted to be simultaneously fragmented. As the optimum fragmentation energy for a given parent or precursor ion is dependent both upon the mass to charge ratio of the ion to be fragmented and also the charge state of the ion, then there will be no single fragmentation energy which is optimum for all the parent or precursor ions which are desired to be simultaneously fragmented. Accordingly, some parent or precursor ions may not fragmented in an optimal manner or indeed it is possible that some parent or precursor ions may not be fragmented at all.

It might be considered that the fragmentation energy could be progressively ramped or stepped during an acquisition period to ensure that at least some portion of the acquisition time is spent at or close to the optimum fragmentation energy for different parent or precursor ions. However, if this approach were to be adopted then a significant proportion of the acquisition time would still be spent with the parent or precursor ions obtaining non-optimum fragmentation energies. As a result, the intensity of fragment ions in a fragment ion mass spectrum is likely to remain relatively low. Another consequence of attempting to step or ramp the fragmentation energy during a fragmentation mode of operation may be that some of the parent or precursor ions will remain intact and therefore, disadvantageously, these parent or precursor ions will be observed in what is supposed to be a data set relating entirely to fragment ions.

According to an aspect of the present invention there is provided a mass spectrometer comprising:

an ion mobility spectrometer or separator, the ion mobility spectrometer or separator being arranged and adapted to separate ions according to their ion mobility;

acceleration means arranged and adapted to accelerate first ions emerging from the ion mobility spectrometer or separator at a time $t_1$ so that they obtain a first kinetic energy $E_1$ and to accelerate second different ions emerging from the ion mobility spectrometer or separator at a second later time $t_2$ so that they obtain a second different kinetic energy $E_2$; and a fragmentation device arranged to receive ions accelerated by the acceleration means.

The first and second ions preferably have substantially different mass to charge ratios but preferably the same charge state.

The acceleration means is preferably arranged and adapted to alter and/or vary and/or scan the kinetic energy which ions obtain as they pass from the ion mobility spectrometer or separator to the fragmentation device. The acceleration means is preferably arranged and adapted to alter and/or vary and/or scan the kinetic energy which ions obtain as they pass from the ion mobility spectrometer or separator to the fragmentation device in a substantially continuous and/or linear and/or progressive and/or regular manner. Alternatively, the acceleration means may be arranged and adapted to alter and/or vary and/or scan the kinetic energy which ions obtain as they pass from the ion mobility spectrometer or separator to the fragmentation device in a substantially non-continuous and/or non-linear and/or stepped manner.

According to the preferred embodiment $E_2 > E_1$.

The acceleration means is preferably arranged and adapted to progressively increase with time the kinetic energy which ions obtain as they are transmitted from the ion mobility spectrometer or separator to the fragmentation device. Preferably, the acceleration means is arranged and adapted to accelerate ions such that they obtain a substantially optimum kinetic energy for fragmentation as they enter the fragmentation device.

According to an aspect of the present invention there is provided a mass spectrometer comprising:

an ion mobility spectrometer or separator, the ion mobility spectrometer or separator being arranged and adapted to separate ions according to their ion mobility;

acceleration means arranged and adapted to accelerate first ions emerging from the ion mobility spectrometer or separator at a time $t_1$ through a first potential difference $V_1$ and to accelerate second different ions emerging from the ion mobility spectrometer or separator at a second later time $t_2$ through a second different potential difference $V_2$; and a fragmentation device arranged to receive ions accelerated by the acceleration means.

The first and second ions preferably have substantially different mass to charge ratios but preferably the same charge state.

The acceleration means is preferably arranged and adapted to alter and/or vary and/or scan the potential difference through which ions pass as they pass from the ion mobility spectrometer or separator to the fragmentation device. The acceleration means is preferably arranged and adapted to alter and/or vary and/or scan the potential difference through which ions pass as they pass from the ion mobility spectrometer or separator to the fragmentation device in a substantially continuous and/or linear and/or progressive and/or regular manner. Alternatively, the acceleration means may be arranged and adapted to alter and/or vary and/or scan the potential difference through which ions pass as they pass from the ion mobility spectrometer or separator to the fragmentation device in a substantially non-continuous and/or non-linear and/or stepped manner.

According to the preferred embodiment $V_2>V_1$.

The acceleration means is preferably arranged and adapted to progressively increase the potential difference through which ions pass over a period of time as they are transmitted from the ion mobility spectrometer or separator to the fragmentation device.

According to a less preferred embodiment it is contemplated that situations may occur wherein $V_2<V_1$. For example, this may occur when a multiply charged ion is fragmented. According to this less preferred embodiment the acceleration means is arranged and adapted to decrease the potential difference through which ions pass over a period of time as they are transmitted from the ion mobility spectrometer or separator to the fragmentation device.

The acceleration means is preferably arranged and adapted to accelerate ions such that they pass through a substantially optimum potential difference for fragmentation as they enter the fragmentation device. The acceleration means is preferably arranged and adapted to accelerate and/or less preferably to decelerate ions into the fragmentation device.

The ion mobility spectrometer or separator is preferably a gas phase electrophoresis device and is preferably arranged to temporally separate ions according to their ion mobility or a related physico-chemical property.

According to an embodiment the ion mobility spectrometer or separator may comprise a drift tube and one or more electrodes for maintaining an axial DC voltage gradient along at least a portion of the drift tube. The ion mobility spectrometer or separator may further comprise means for maintaining an axial DC voltage gradient along at least a portion of the drift tube.

According to another embodiment the ion mobility spectrometer or separator may comprise one or more multipole rod sets. The ion mobility spectrometer or separator may, for example, comprise one or more quadrupole, hexapole, octapole or higher order rod sets. According to a particularly preferred embodiment the one or more multipole rod sets are axially segmented or comprise a plurality of axial segments.

According to another embodiment the ion mobility spectrometer or separator may comprise a plurality of electrodes, (for example, at least 10, 20, 30, 40, 50, 60, 70, 80, 90 or 100 electrodes) and wherein at least 5%, 10%, 15%, 20%, 25%, 30%, 35%, 40%, 45%, 50%, 55%, 60%, 65%, 70%, 75%, 80%, 85%, 90%, 95% or 100% of the electrodes of the ion mobility spectrometer or separator have apertures through which ions are transmitted in use. According to an embodiment at least 5%, 10%, 15%, 20%, 25%, 30%, 35%, 40%, 45%, 50%, 55%, 60%, 65%, 70%, 75%, 80%, 85%, 90%, 95% or 100% of the electrodes of the ion mobility spectrometer or separator may have apertures which are of substantially the same size or area. Alternatively, according to a less preferred embodiment at least 5%, 10%, 15%, 20%, 25%, 30%, 35%, 40%, 45%, 50%, 55%, 60%, 65%, 70%, 75%, 80%, 85%, 90%, 95% or 100% of the electrodes of the ion mobility spectrometer or separator may have apertures which become progressively larger and/or smaller in size or in area in a direction along the axis of the ion guide or ion trap.

At least 5%, 10%, 15%, 20%, 25%, 30%, 35%, 40%, 45%, 50%, 55%, 60%, 65%, 70%, 75%, 80%, 85%, 90%, 95% or 100% of the electrodes of the ion mobility spectrometer or separator may preferably have apertures having internal diameters or dimensions selected from the group consisting of: (i) $\leqq$1.0 mm; (ii) $\leqq$2.0 mm; (iii) $\leqq$3.0 mm; (iv) $\leqq$4.0 mm; (v) $\leqq$5.0 mm; (vi) $\leqq$6.0 mm; (vii) $\leqq$7.0 mm; (viii) $\leqq$8.0 mm; (ix) $\leqq$9.0 mm; (x) $\leqq$10.0 mm; and (xi) >10.0 mm.

According to an alternative embodiment the ion mobility spectrometer or separator may comprise a plurality of plate or mesh electrodes wherein at least some of the plate or mesh electrodes are arranged generally in the plane in which ions travel in use. Preferably, at least 50%, 55%, 60%, 65%, 70%, 75%, 80%, 85%, 90%, 95% or 100% of the plate or mesh electrodes are arranged generally in the plane in which ions travel in use. The ion mobility spectrometer or separator may comprise, for example, at least 2, 3, 4, 5, 6, 7, 8, 9, 10, 11, 12, 13, 14, 15, 16, 17, 18, 19, 20 or >20 plate or mesh electrodes. The plate or mesh electrodes are preferably supplied with an AC or RF voltage in order to confine ions within the device. Adjacent plate or mesh electrodes are preferably supplied with opposite phases of the AC or RF voltage.

The ion mobility spectrometer or separator in its various different forms preferably comprises a plurality of axial segments. For example, the ion mobility spectrometer or separator may comprise at least 5, 10, 15, 20, 25, 30, 35, 40, 45, 50, 55, 60, 65, 70, 75, 80, 85, 90, 95 or 100 axial segments.

According to a preferred embodiment DC voltage means is preferably provided for maintaining a substantially constant DC voltage gradient along at least a portion of the axial length of the ion mobility spectrometer or separator. The DC voltage means may, for example, be arranged and adapted to maintain a substantially constant DC voltage gradient along at least 5%, 10%, 15%, 20%, 25%, 30%, 35%, 40%, 45%, 50%, 55%, 60%, 65%, 70%, 75%, 80%, 85%, 90%, 95% or 100% of the axial length of the ion mobility spectrometer or separator.

According to another embodiment transient DC voltage means may be provided and may be arranged and adapted to apply or supply one or more transient DC voltages or one or more transient DC voltage waveforms to the electrodes forming the ion mobility spectrometer or separator. The transient DC voltages or transient DC voltage waveforms preferably urge at least some ions along at least a portion of the axial length of the ion mobility spectrometer or separator. The transient DC voltage means is preferably arranged and adapted to apply one or more transient DC voltages or one or more transient DC voltage waveforms to electrodes along at least 5%, 10%, 15%, 20%, 25%, 30%, 35%, 40%, 45%, 50%, 55%, 60%, 65%, 70%, 75%, 80%, 85%, 90%, 95% or 100% of the axial length of the ion mobility spectrometer or separator.

According to another embodiment AC or RF voltage means are preferably provided and are arranged and adapted to apply two or more phase shifted AC or RF voltages to the electrodes forming the ion mobility spectrometer or separator. According to this embodiment the AC or RF voltage urges at least some ions along at least a portion of the axial length of the ion mobility spectrometer or separator. Preferably, the AC or RF voltage means is arranged and adapted to apply one or more AC or RF voltages to electrodes along at least 5%, 10%, 15%, 20%, 25%, 30%, 35%, 40%, 45%, 50%, 55%, 60%, 65%, 70%, 75%, 80%, 85%, 90%, 95% or 100% of the axial length of the ion mobility spectrometer or separator.

The ion mobility spectrometer or separator preferably comprises a plurality of electrodes and AC or RF voltage means are preferably provided which are arranged and adapted to apply an AC or RF voltage to at least 5%, 10%, 20%, 30%, 40%, 50%, 60%, 70%, 80%, 90%, 95% or 100% of the plurality of electrodes of the ion mobility spectrometer or separator in order to confine ions radially within the ion mobility spectrometer or separator or about a central axis of the ion mobility spectrometer or separator. The AC or RF voltage means used to confine ions within the device is preferably arranged and adapted to supply an AC or RF voltage to the plurality of electrodes of the ion mobility spectrometer or separator having an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak. The AC or RF voltage means is preferably arranged and adapted to supply an AC or RF voltage to the plurality of electrodes of the ion mobility spectrometer or separator having a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

According to a preferred embodiment the mass spectrometer preferably further comprises means arranged and adapted to maintain at least a portion, preferably at least 10%, 20%, 30%, 40%, 50%, 60%, 70%, 80%, 90%, 95% or 100% of the ion mobility spectrometer or separator at a pressure selected from the group consisting of: (i) >0.001 mbar; (ii) >0.01 mbar; (iii) >0.1 mbar; (iv) >1 mbar; (v) >10 mbar; (vi) >100 mbar; (vii) 0.001-100 mbar; (viii) 0.01-10 mbar; and (ix) 0.1-1 mbar.

An ion guide or transfer means may be arranged or otherwise positioned between the ion mobility spectrometer or separator and the fragmentation device in order to guide or transfer ions emerging from the ion mobility spectrometer or separator towards or into the fragmentation device.

The fragmentation device preferably comprises a collision or fragmentation cell. The collision or fragmentation cell is preferably arranged to fragment ions by Collisional Induced Dissociation ("CID") with collision gas molecules in the collision or fragmentation cell.

The collision or fragmentation cell preferably comprises a housing having an upstream opening for allowing ions to enter the collision or fragmentation cell and a downstream opening for allowing ions to exit the collision or fragmentation cell.

According to an embodiment the fragmentation device may comprise a multipole rod set e.g. a quadrupole, hexapole, octapole or higher order rod set. The multipole rod set may be axially segmented.

The fragmentation device preferably comprises a plurality of electrodes e.g. at least 10, 20, 30, 40, 50, 60, 70, 80, 90 or 100 electrodes. According to an embodiment at least 5%, 10%, 15%, 20%, 25%, 30%, 35%, 40%, 45%, 50%, 55%, 60%, 65%, 70%, 75%, 80%, 85%, 90%, 95% or 100% of the electrodes of the fragmentation device have apertures through which ions are transmitted in use. Preferably, at least 5%, 10%, 15%, 20%, 25%, 30%, 35%, 40%, 45%, 50%, 55%, 60%, 65%, 70%, 75%, 80%, 85%, 90%, 95% or 100% of the electrodes of the fragmentation device have apertures which are of substantially the same size or area. According to an alternative less preferred embodiment at least 5%, 10%, 20%, 30%, 40%, 50%, 60%, 70%, 80%, 90%, 95% or 100% of the electrodes of the fragmentation device may have apertures which become progressively larger and/or smaller in size or in area in a direction along the axis of the fragmentation device.

Preferably, at least 5%, 10%, 20%, 30%, 40%, 50%, 60%, 70%, 80%, 90%, 95% or 100% of the electrodes of the fragmentation device have apertures having internal diameters or dimensions selected from the group consisting of: (i) ≦1.0 mm; (ii) ≦2.0 mm; (iii) ≦3.0 mm; (iv) ≦4.0 mm; (v) ≦5.0 mm; (vi) ≦6.0 mm; (vii) ≦7.0 mm; (viii) ≦8.0 mm; (ix) ≦9.0 mm; (x) ≦10.0 mm; and (xi) >10.0 mm.

According to an alternative embodiment the fragmentation device may comprise a plurality of plate or mesh electrodes and wherein at least some of the plate or mesh electrodes are arranged generally in the plane in which ions travel in use. Preferably, the fragmentation device may comprise a plurality of plate or mesh electrodes and wherein at least 50%, 55%, 60%, 65%, 70%, 75%, 80%, 85%, 90%, 95% or 100% of the plate or mesh electrodes are arranged generally in the plane in which ions travel in use. The fragmentation device may comprise at least 2, 3, 4, 5, 6, 7, 8, 9, 10, 11, 12, 13, 14, 15, 16, 17, 18, 19, 20 or >20 plate or mesh electrodes. Preferably, the plate or mesh electrodes are supplied with an AC or RF voltage in order to confine ions within the fragmentation device. Adjacent plate or mesh electrodes are preferably supplied with opposite phases of the AC or RF voltage.

The fragmentation device may comprise a plurality of axial segments e.g. at least 5, 10, 15, 20, 25, 30, 35, 40, 45, 50, 55, 60, 65, 70, 75, 80, 85, 90, 95 or 100 axial segments.

According to an embodiment the fragmentation device further comprises DC voltage means for maintaining a substantially constant DC voltage gradient along at least a portion of the axial length of the fragmentation device. Preferably, the DC voltage means is arranged and adapted to maintain a substantially constant DC voltage gradient along at least 5%, 10%, 15%, 20%, 25%, 30%, 35%, 40%, 45%, 50%, 55%, 60%, 65%, 70%, 75%, 80%, 85%, 90%, 95% or 100% of the axial length of the fragmentation device.

According to an embodiment the fragmentation may comprise transient DC voltage means arranged and adapted to apply one or more transient DC voltages or one or more transient DC voltage waveforms to electrodes forming the fragmentation device in order to urge at least some ions along at least a portion of the axial length of the fragmentation device. Preferably, the transient DC voltage means is arranged and adapted to apply one or more transient DC voltages or one or more transient DC voltage waveforms to electrodes along at least 5%, 10%, 15%, 20%, 25%, 30%, 35%, 40%, 45%, 50%, 55%, 60%, 65%, 70%, 75%, 80%, 85%, 90%, 95% or 100% of the axial length of the fragmentation device.

According to an embodiment the fragmentation device may comprise AC or RF voltage means arranged and adapted to apply two or more phase shifted AC or RF voltages to electrodes forming the fragmentation device in order to urge at least some ions along at least a portion of the axial length of the fragmentation device. Preferably, the AC or RF voltage means is arranged and adapted to apply one or more AC or RF voltages to electrodes along at least 5%, 10%, 15%, 20%, 25%, 30%, 35%, 40%, 45%, 50%, 55%, 60%, 65%, 70%, 75%, 80%, 85%, 90%, 95% or 100% of the axial length of the fragmentation device.

The fragmentation device preferably comprises a plurality of electrodes and an AC or RF voltage means is preferably provided which is arranged and adapted to apply an AC or RF voltage to at least 1%, 5%, 10%, 20%, 30%, 40%, 50%, 60%, 70%, 80%, 90%, 95% or 100% of the plurality of electrodes of the fragmentation device in order to confine ions radially within the fragmentation device or about a central axis of the fragmentation device. Preferably, the AC or RF voltage means is arranged and adapted to supply an AC or RF voltage to the plurality of electrodes of the fragmentation device having an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak. Preferably, the AC or RF voltage means is arranged and adapted to supply an AC or RF voltage to the plurality of electrodes of the fragmentation device having a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

According to an embodiment at least 10%, 20%, 30%, 40%, 50%, 60%, 70%, 80%, 90%, 95% or 100% the fragmentation device is preferably arranged and adapted to be maintained at a pressure selected from the group consisting of: (i) >0.0001 mbar; (ii) >0.001 mbar; (iii) >0.01 mbar; (iv) >0.1 mbar; (v) >1 mbar; (vi) >10 mbar; (vii) 0.0001-0.1 mbar; and (viii) 0.001-0.01 mbar.

According to a less preferred embodiment the fragmentation device may be arranged and adapted to fragment ions by Surface Induced Dissociation ("SID") wherein ions are fragmented by accelerating them into a surface or electrode rather than gas molecules.

According to an embodiment the mass spectrometer may comprise means arranged and adapted to trap ions upstream of said ion mobility spectrometer or separator and to pass or transmit a pulse of ions to said ion mobility spectrometer or separator in a mode of operation.

A control system is preferably provided which is preferably arranged and adapted to switch the fragmentation device between a first mode of operation wherein ions are substantially fragmented and a second mode of operation wherein substantially less or no ions are fragmented. In the first (fragmentation) mode of operation ions exiting the ion mobility spectrometer or separator are preferably accelerated through a relatively high potential difference selected from the group consisting of: (i) ≧10 V; (ii) ≧20 V; (iii) ≧30 V; (iv) ≧40 V; (v) ≧50 V; (vi) ≧60 V; (vii) ≧70 V; (viii) ≧80 V; (ix) ≧90 V; (x) ≧100 V; (xi) ≧110 V; (xii) ≧120 V; (xiii) ≧130 V; (xiv) ≧140 V; (xv) ≧150 V; (xvi) ≧160 V; (xvii) ≧170 V; (xviii) ≧180 V; (xix) ≧190 V; and (xx) ≧200 V. In the second (non-fragmentation) mode of operation ions exiting the ion mobility spectrometer or separator are preferably accelerated through a relatively low potential difference selected from the group consisting of: (i) ≦20 V; (ii) ≦15 V; (iii) ≦10 V; (iv) ≦5V; and (v) ≦1V.

The control system is preferably arranged and adapted to regularly and/or repeatedly switch the fragmentation device between the first mode of operation and the second mode of operation at least once every 1 ms, 5 ms, 10 ms, 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s or 10 s.

The mass spectrometer preferably further comprises an ion source preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; and (xvii) an Atmospheric Pressure Matrix Assisted Laser Desorption Ionisation ion source. The ion source may be a pulsed or continuous ion source.

The mass spectrometer preferably further comprises a mass analyser arranged downstream of the fragmentation device. The mass analyser is preferably selected from the group consisting of: (i) a Fourier Transform ("FT") mass analyser; (ii) a Fourier Transform Ion Cyclotron Resonance ("FTICR") mass analyser; (iii) a Time of Flight ("TOF") mass analyser; (iv) an orthogonal acceleration Time of Flight ("oaTOF") mass analyser; (v) an axial acceleration Time of Plight mass analyser; (vi) a magnetic sector mass spectrometer; (vii) a Paul or 3D quadrupole mass analyser; (viii) a 2D or linear quadrupole mass analyser; (ix) a Penning trap mass analyser; (x) an ion trap mass analyser; (xi) a Fourier Transform orbitrap; (xii) an electrostatic Fourier Transform mass spectrometer; and (xiii) a quadrupole mass analyser.

The mass spectrometer may further comprise one or more mass or mass to charge ratio filters and/or analysers arranged upstream of said ion mobility spectrometer or separator. The one or more mass or mass to charge ratio filters and/or analysers may be selected from the group consisting of: (i) a quadrupole mass filter or analyser; (ii) a Wien filter; (iii) a magnetic sector mass filter or analyser; (iv) a velocity filter; and (v) an ion gate.

According to an aspect of the present invention there is provided a method of mass spectrometry comprising:

separating ions according to their ion mobility in an ion mobility spectrometer or separator;

accelerating first ions emerging from the ion mobility spectrometer or separator at a time $t_1$ so that they obtain a first kinetic energy $E_1$;

accelerating second different ions emerging from the ion mobility spectrometer or separator at a second later time $t_2$ so that they obtain a second different kinetic energy $E_2$; and fragmenting the first and second ions in a fragmentation device.

According to an aspect of the present invention there is provided a method of mass spectrometry comprising:

separating ions according to their ion mobility in an ion mobility spectrometer or separator;

accelerating first ions emerging from the ion mobility spectrometer or separator at a time $t_1$ through a first potential difference $V_1$;

accelerating second different ions emerging from the ion mobility spectrometer or separator at a second later time $t_2$ through a second different potential difference $V_2$; and fragmenting the first and second ions in a fragmentation device.

The preferred embodiment preferably involves temporally separating ions in a substantially predictable manner using an ion mobility spectrometer or separator device which is preferably arranged upstream of a fragmentation device. The fragmentation device preferably comprises a collision or fragmentation cell housing a collision gas maintained at a pressure $>10^{-3}$ mbar. At any given time the mass to charge ratio range (for a given charge state) of ions exiting the ion mobility separator can be generally predicted. Accordingly, the mass to charge ratio of ions which are then caused to enter the collision or fragmentation cell at any particular time can also be generally predicted. The preferred embodiment involves setting the energy of the ions entering the collision or fragmentation cell and varying the energy with time in such a way that ions continue to possess the optimal energy for fragmentation as they are preferably accelerated into or towards the fragmentation device.

The preferred embodiment therefore enables ions to be fragmented with a substantially improved fragmentation efficiency across the entire mass to charge ratio range of ions of interest and therefore represents an important advance in the art.

Various embodiments of the present invention will now be described, by way of example only, and with reference to the accompanying drawings in which.

Figure 1:
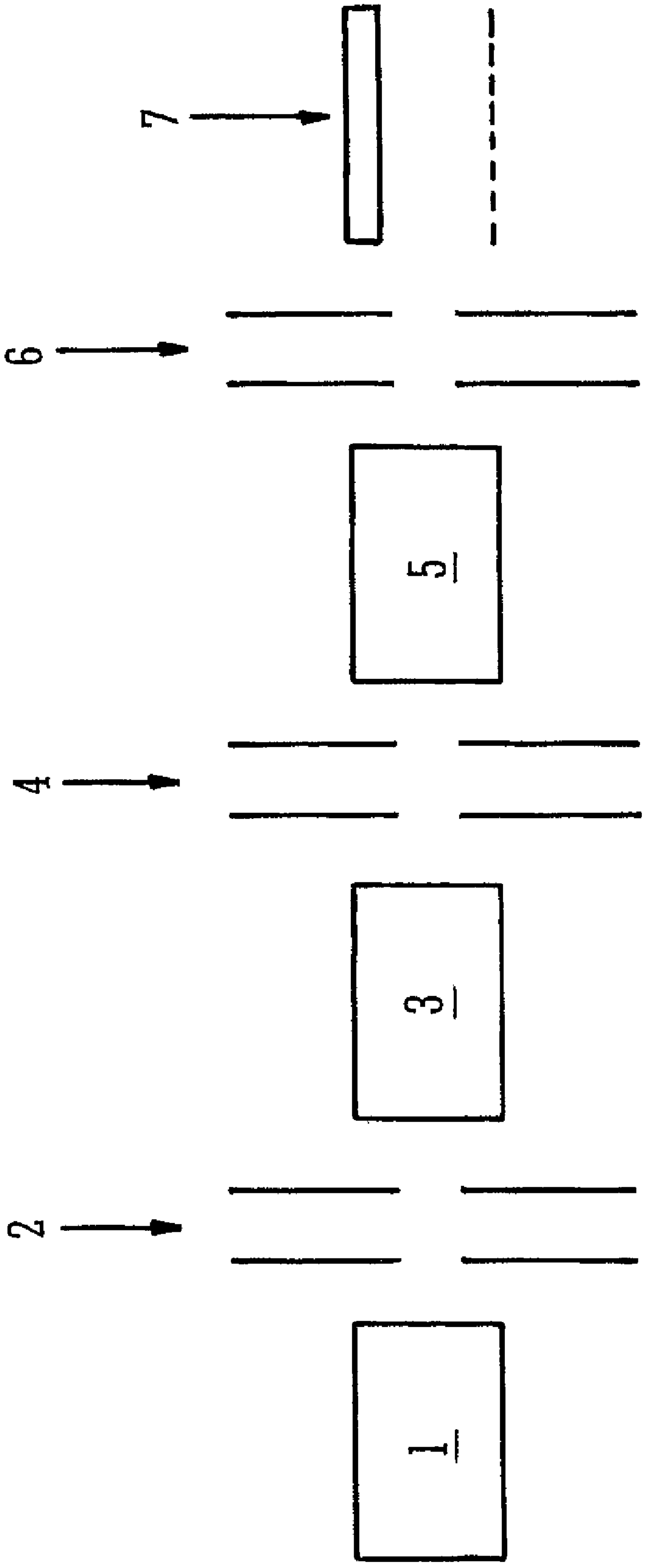
FIG. 1 shows in schematic form a mass spectrometer according to a preferred embodiment.

A preferred embodiment of the present invention will now be described with reference to FIG. 1. A mass spectrometer is preferably provided which comprises an ion source 1. A first transfer optic 2 or ion guide is preferably arranged downstream of the ion source 1 and an ion mobility spectrometer or separator 3 is preferably arranged downstream of the first transfer optic 2 or ion guide. The first transfer optic 2 or ion guide may according to an embodiment comprise a quadrupole rod set ion guide or an ion tunnel ion guide having a plurality of electrodes having apertures through which ions are transmitted in use.

The ion mobility spectrometer or separator 3 is preferably arranged to separate ions according to their ion mobility or a related physico-chemical property. The ion mobility spectrometer or separator 3 is therefore preferably a form of gas phase electrophoresis device.

The ion mobility spectrometer or separator 3 may take a number of different forms which will be discussed in more detail below. According to an embodiment the ion mobility spectrometer or separator 3 may comprise a travelling wave ion mobility separator device wherein one or more travelling or transient DC voltages or waveforms are applied to electrodes forming the device. Alternatively, the device 3 may comprise a drift cell which may or may not radially confine ions.

According to one embodiment the ion mobility spectrometer or separator 3 may comprise a drift tube having one or more guard ring electrodes. A constant axial DC voltage gradient is preferably maintained along the length of the drift tube. The drift tube is preferably maintained at a gas pressure $>10^{-3}$ mbar, more preferably $>10^{-2}$ mbar and ions are preferably urged along and through the device by the application of the constant DC voltage gradient. Ions having a relatively high ion mobility will emerge from the ion mobility separator or spectrometer 3 prior to ions having a relatively low ion mobility.

According to other embodiments the ion mobility spectrometer or separator 3 may comprises a multipole rod set. According to a particularly preferred embodiment the multipole rod set (for example, a quadrupole rod set) may be axially segmented. The plurality of axial segments may be maintained at different DC potentials so that a static axial DC voltage gradient may be maintained along the length of the ion mobility spectrometer or separator 3. It is also contemplated that according to another embodiment one or more time varying DC potentials may be applied to the axial segments in order to urge ions along and through the axial length of the ion mobility spectrometer or separator 3. Alternatively, one or more AC or RF voltages may be applied to the axial segments to urge ions along the length of the ion mobility spectrometer or separator 3. It will be appreciated that according to these various embodiments ions are caused to separate according to their ion mobility as they pass through a background gas present in the preferably axial drift region of the ion mobility spectrometer or separator 3.

The ion mobility spectrometer or separator 3 may according to another embodiment comprise an ion tunnel or ion funnel arrangement comprising a plurality of plate, ring or wire electrodes having apertures through which ions are transmitted in use. In an ion tunnel arrangement substantially all of the electrodes have similar sized apertures. In an ion funnel arrangement the size of the apertures preferably becomes progressively smaller or larger. According to these embodiments a constant DC voltage gradient may be maintained along the length of the ion tunnel or ion funnel ion mobility spectrometer or separator. Alternatively, one or more transient or time varying DC potentials or an AC or RF voltage may be applied to the electrodes forming the ion tunnel or ion funnel arrangement in order to urge ions along the length of the ion mobility spectrometer or separator 3.

According to a yet further embodiment the ion mobility spectrometer or separator 3 may comprise a sandwich plate arrangement wherein the ion mobility spectrometer or separator 3 comprises a plurality of plate or mesh electrodes arranged generally in the plane in which ions travel in use.

The electrode arrangement may also preferably be axially segmented so that as with the other embodiments either a static DC potential gradient, a time varying DC potential or an AC or RF voltage may be applied to the axial segments in order to urge ions along and through the length of the ion mobility spectrometer or separator 3.

Ions are preferably radially confined within the ion mobility spectrometer or separator 3 due to the application of an AC or RF voltage to the electrodes forming the ion mobility spectrometer or separator 3. The applied AC or RF voltage preferably results in a radial pseudo-potential well being created which preferably prevents ions from escaping in the radial direction.

According to an embodiment an ion trap (not shown) is preferably provided upstream of the ion mobility spectrometer or separator 3. The ion trap is preferably arranged to periodically release one or more pulses of ions into or towards the ion mobility spectrometer or separator 3.

A second transfer optic 4 or ion guide may optionally be arranged downstream of the ion mobility spectrometer or separator 3 in order to receive ions emitted or leaving the ion mobility spectrometer or separator 3. The second transfer optic 4 or ion guide may according to an embodiment comprise a quadrupole rod set ion guide or an ion tunnel ion guide having a plurality of electrodes having apertures through which ions are transmitted in use.

A fragmentation device 5 which preferably comprises a collision or fragmentation cell 5 is preferably arranged downstream of the second transfer optic 4 or ion guide or may be arranged to directly or indirectly receive ions emitted from the ion mobility spectrometer or separator 3.

The fragmentation device 5 preferably comprises a collision or fragmentation cell 5 which may take a number of different forms. In the simplest form the collision or fragmentation device 5 may comprise a multipole rod set collision or fragmentation cell. According to an embodiment the collision or fragmentation cell 5 may comprise a travelling wave collision or fragmentation cell 5 wherein one or more travelling or transient DC voltages or waveforms are applied to electrodes forming the collision or fragmentation cell in order to urge ions through the collision or fragmentation 5. The application of a transient DC potential to the electrodes forming the fragmentation device 5 preferably speeds up the transit time of fragment ions through the collision or fragmentation cell 5.

Alternatively, the collision or fragmentation cell 5 may comprise a linear acceleration collision or fragmentation cell wherein a constant axial DC voltage gradient is maintained along at least a portion of the axial length of the collision or fragmentation cell 5.

According to the preferred embodiment the collision or fragmentation cell 5 is preferably arranged to fragment ions by Collisional Induced Dissociation ("CID") wherein ions are accelerated into the collision or fragmentation cell 5 with sufficient energy such that the ions fragment upon colliding with collision gas provided within the collision or fragmentation cell 5. According to a less preferred embodiment the fragmentation device may comprise a device for fragmenting ions by Surface Induced Dissociation ("SID") wherein ions are fragmented by accelerating them into a surface or electrode.

According to an embodiment the fragmentation device 5 may comprise a multipole rod set. According to an embodiment the multipole rod set (for example, a quadrupole rod set) may be axially segmented. The plurality of axial segments may be maintained at different DC potentials so that a static axial DC voltage gradient may be maintained along the length of the fragmentation device 5. It is contemplated that according to another embodiment one or more time varying DC potentials may be applied to the axial segments in order to urge fragment ions along and through the axial length of the fragmentation device 5. Alternatively, one or more AC or RF voltages may be applied to the axial segments in order to urge fragment ions along the length of the fragmentation device 5. Although it is not necessary to apply a constant non-zero DC voltage gradient along the length of the fragmentation device or to apply one or more transient DC or AC or RF voltages to the electrodes forming the fragmentation device, the application of a static or time varying electric field along the length of the fragmentation device 5 can improve the transit time of fragment ions through the fragmentation device 5.

The fragmentation device 5 may according to another embodiment comprise an ion tunnel or ion funnel arrangement comprising a plurality of plate electrodes having apertures through which ions are transmitted in use. In an ion tunnel arrangement substantially all of the electrodes have similar sized apertures. In an ion funnel arrangement the size of the apertures preferably becomes progressively smaller or larger. According to these embodiments a constant DC voltage gradient may be maintained along the length of the ion tunnel or ion funnel fragmentation device. Alternatively, one or more transient or time varying DC potentials or an AC or RF voltage may be applied to the electrodes forming the ion tunnel or ion funnel arrangement in order to urge ions along the length of the fragmentation device 5.

According to a yet further embodiment the fragmentation device 5 may comprise a sandwich plate arrangement wherein the fragmentation device 5 comprises a plurality of plate or mesh electrodes arranged generally in the plane in which ions travel in use. The electrode arrangement may also preferably be axially segmented so that as with the other embodiments either a static DC potential gradient, a time varying DC potential or an AC or RF voltage may be applied to the axial segments in order to urge fragment ions along and through the fragmentation device 5.

Ions are preferably radially confined within the fragmentation device 5 due to the application of an AC or RF voltage to the electrodes forming the fragmentation device 5. The applied AC or RF voltage preferably results in a radial pseudo-potential well being created which preferably prevents ions from escaping in the radial direction.

A collision or fragmentation gas is preferably provided within the fragmentation device 5. The collision or fragmentation gas may comprise helium, methane, neon, nitrogen, argon, xenon, air or a mixture of such gases. Nitrogen or argon are particularly preferred.

A third transfer optic 6 or ion guide may be arranged downstream of the fragmentation device 5 to act as an interface between the fragmentation device 5 and an orthogonal acceleration Time of Flight mass analyser. The third transfer optic 6 or ion guide may according to an embodiment comprise a quadrupole rod set ion guide or an ion tunnel ion guide having a plurality of electrodes having apertures through which ions are transmitted in use. A pusher electrode 7 of the orthogonal acceleration Time of Flight mass analyser is shown in FIG. 1. The drift region, reflection and ion detector of the orthogonal acceleration mass analyser are not shown in FIG. 1. The operation of a Time of Flight mass analyser is well known to those skilled in the art and will not therefore be described in more detail.

The ion source 1 may take a number of different forms and according to a preferred embodiment a MALDI ion source may be provided. MALDI ion sources have the advantage that ions produced by the MALDI ion source 1 will normally be predominantly singly charged. This simplifies the operation of the ion mobility spectrometer or separator 3 and in particular simplifies the step of varying the potential difference which ions are caused to experience according to the preferred embodiment as they exit the ion mobility spectrometer or separator 3. This aspect of the preferred embodiment will be described in more detail below.

According to other embodiments other types of ion source 1 may be used. For example, an Atmospheric Pressure Ionisation (API) ion source and particularly an Electrospray ionisation ion source may be used.

Ions emitted by the ion source 1 may be accumulated for a period of time either within the ion source 1 itself, within a separate ion trap (not shown in FIG. 1) or within an upstream portion or section of the ion mobility spectrometer or separator 3. For example, the ion mobility spectrometer or separator 3 may comprise an upstream portion which acts as an ion trapping region and a downstream portion ion in which ions are separated according to their ion mobility.

After ions have been accumulated in some manner, a packet or pulse of ions having a range of different mass to charge ratios is then preferably released. The packet or pulse of ions is preferred arranged to be transmitted or passed either to the ion mobility spectrometer or separator 3 or to the main section of the ion mobility spectrometer or separator 3 in which ions are separated according to their ion mobility.

Since the ions emitted from a MALDI ion source will be predominantly singly charged, the time taken by an ion to pass through and hence exit the ion mobility spectrometer or separator 3 will preferably be a function of the mass to charge ratio of the ion. The relationship between the mass to charge ratio of an ion and the transit or exit time through or from an ion mobility spectrometer or separator 3 is generally known and is predictable and will be discussed in more detail with reference to FIG. 2.

Figure 2:
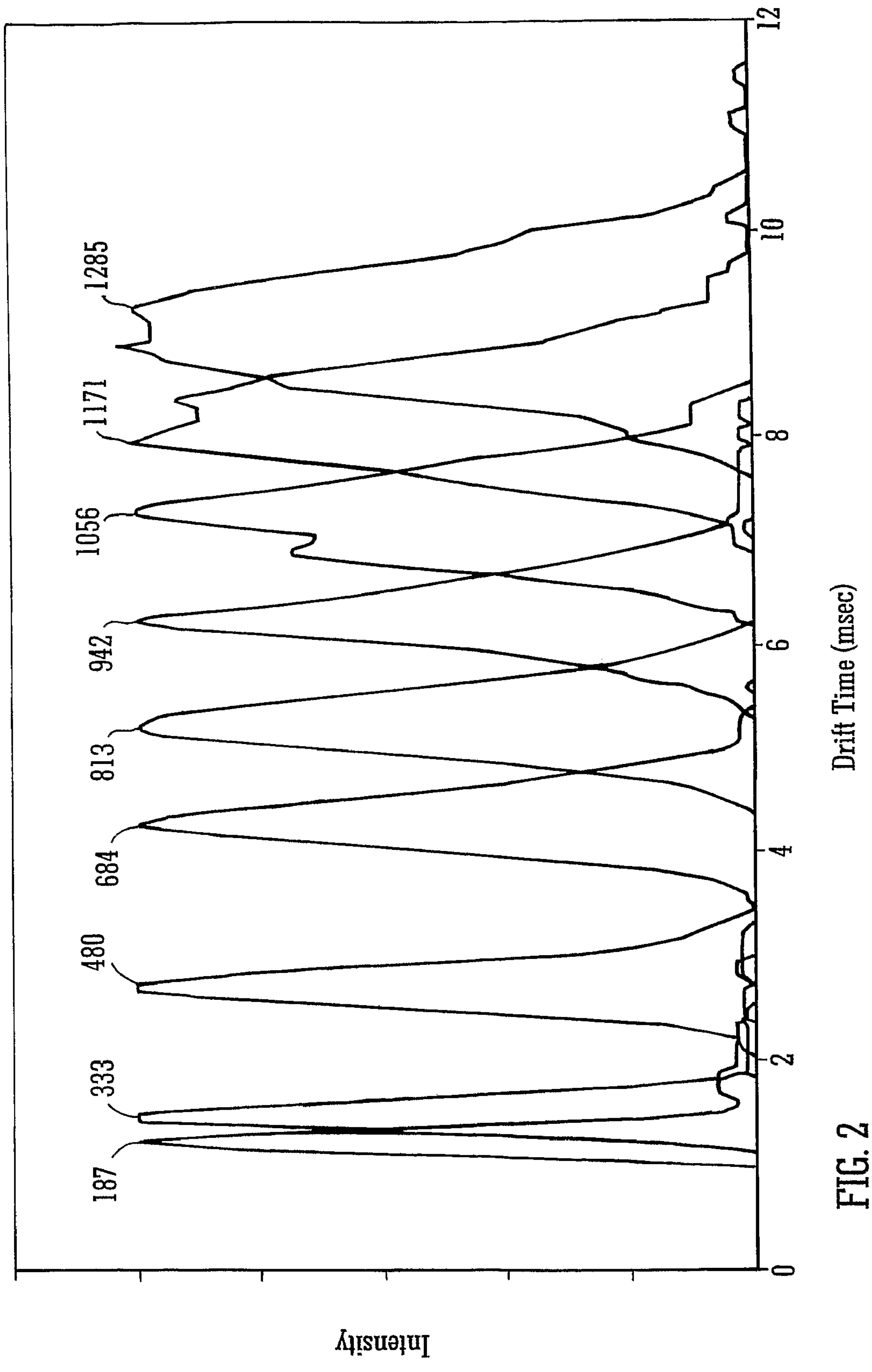
FIG. 2 shows the time taken for singly charged ions having different mass to charge ratios to exit an ion mobility spectrometer or separator according to a preferred embodiment.

FIG. 2 shows some experimental results shows peaks representing different mass to charge ratio singly charged ions and the time taken for the ions to pass through and exit an ion mobility spectrometer or separator 3 according to the preferred embodiment. The mass to charge ratio of the various ions is shown in FIG. 2. As can be seen from FIG. 2, ions having relatively low mass to charge ratios pass through and exit the ion mobility spectrometer or separator 3 relatively quickly whereas ions having relatively high mass to charge ratios take substantially longer to pass through and exit the ion mobility spectrometer or separator 3. For example, as can be seen from FIG. 2 ions having a mass to charge ratio <350 will transit the length of the ion mobility spectrometer or separator 3 in approximately less than 2 ms whereas ions having a mass to charge ratio >1000 will take in excess of approximately 7 ms to transit the length of the ion mobility spectrometer or separator 3.

In FIG. 2 the time shown as zero corresponds with the time that an ion packet or pulse is first released from an accumulation stage or ion trapping region into the main body of the ion mobility spectrometer or separator 3. It can be seen from FIG. 2 that with the particular ion mobility spectrometer or separator 3 used the highest mass to charge ratio ions can take about up to 12 ms or longer to exit the ion mobility spectrometer or separator 3.

The fragmentation device 5 may be arranged to be used in a constant fragmentation mode of operation. However, according to other embodiments the fragmentation device 5 can preferably be effectively repeatedly switched ON and switched OFF preferably during the course of an experimental run.

When the fragmentation device 5 is operated in a non-fragmentation (i.e. parent ion) mode of operation then the fragmentation device 5 is effectively switched OFF and the fragmentation device 5 then effectively acts as an ion guide. In this mode of operation the potential difference maintained between the ion mobility spectrometer or separator 3 and the fragmentation device 5 is preferably maintained relatively low. Ions exiting the ion mobility spectrometer or separator 3 are not therefore accelerated into the fragmentation device 5 without sufficient energy such that they are caused to fragment. Accordingly there is minimal or substantially no fragmentation of parent or precursor ions as they pass through the fragmentation device 5 in this mode of operation. The parent or precursor ions then preferably pass through and exit the fragmentation device 5 substantially unfragmented.

The parent or precursor ions which emerge substantially unfragmented from the fragmentation device 5 then preferably pass through the third transfer optic or ion guide 6 and are then preferably mass analysed by the orthogonal acceleration Time of Flight mass analyser 7. A parent or precursor ion mass spectrum may then be obtained.

When the fragmentation device 5 is operated in a fragmentation mode of operation then the potential difference maintained between the ion mobility spectrometer or separator 3 and the fragmentation device 5 is preferably set such that ions emerging from the ion mobility spectrometer or separator 3 are caused to enter the fragmentation device 5 with optimal energy for fragmentation. According to the preferred embodiment the potential difference maintained between the exit of the ion mobility spectrometer or separator 5 and the entrance to the fragmentation device 5 is preferably progressively increased with time whilst the fragmentation device 5 is being operated in a fragmentation mode of operation (i.e. before it is switched, for example, back to a non-fragmentation mode of operation). This ensures that the ions which emerge from the ion mobility spectrometer or separator 3 are accelerated to an energy such that they then enter the fragmentation device 5 they possess the optimum energy for fragmentation.

It is contemplated that according to an embodiment the fragmentation device may spend unequal amounts of time in a non-fragmentation mode of operation and in a fragmentation mode of operation. For example, during an experimental run the fragmentation device 5 may spend comparatively longer in a fragmentation mode of operation than in a non-fragmentation mode of operation.

Figure 3:
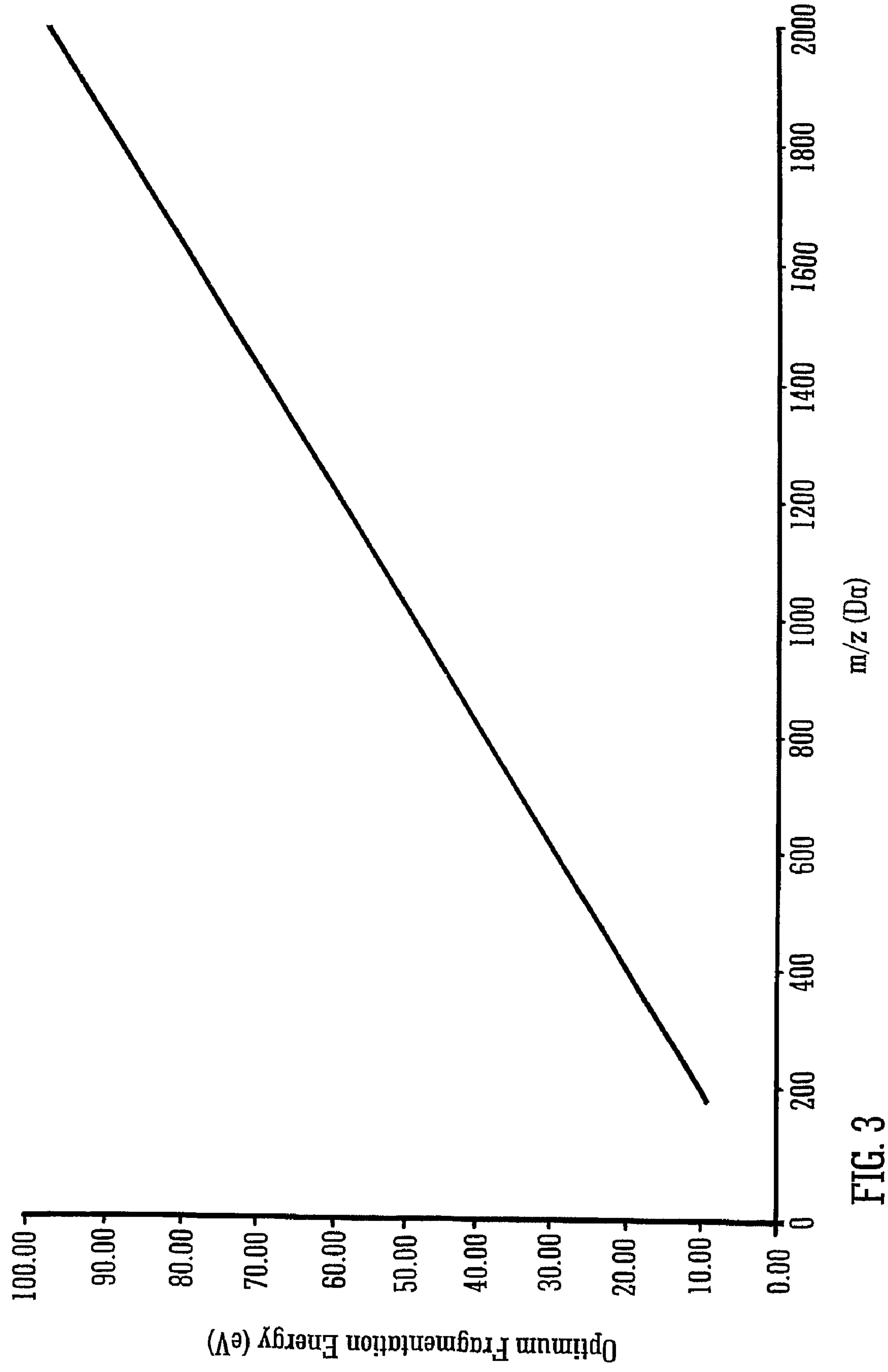
FIG. 3 shows a plot of optimum fragmentation energy against mass to charge ratio for singly charged ions as emitted, for example, from a MALDI ion source.

The optimum fragmentation energy in eV for singly charged ions emitted, for example, from a MALDI ion source is shown plotted against the mass to charge ratio of the ion in FIG. 3. From FIG. 3 it can be seen that ions having, for example, a mass to charge ratio of 200 are optimally fragmented when they possess an energy of approximately 10 eV before colliding with collision gas molecules whereas singly charged ions having a mass to charge ratio of 2000 are optimally fragmented when they possess an energy of approximately 100 eV before colliding with collision gas molecules.

Figure 4:
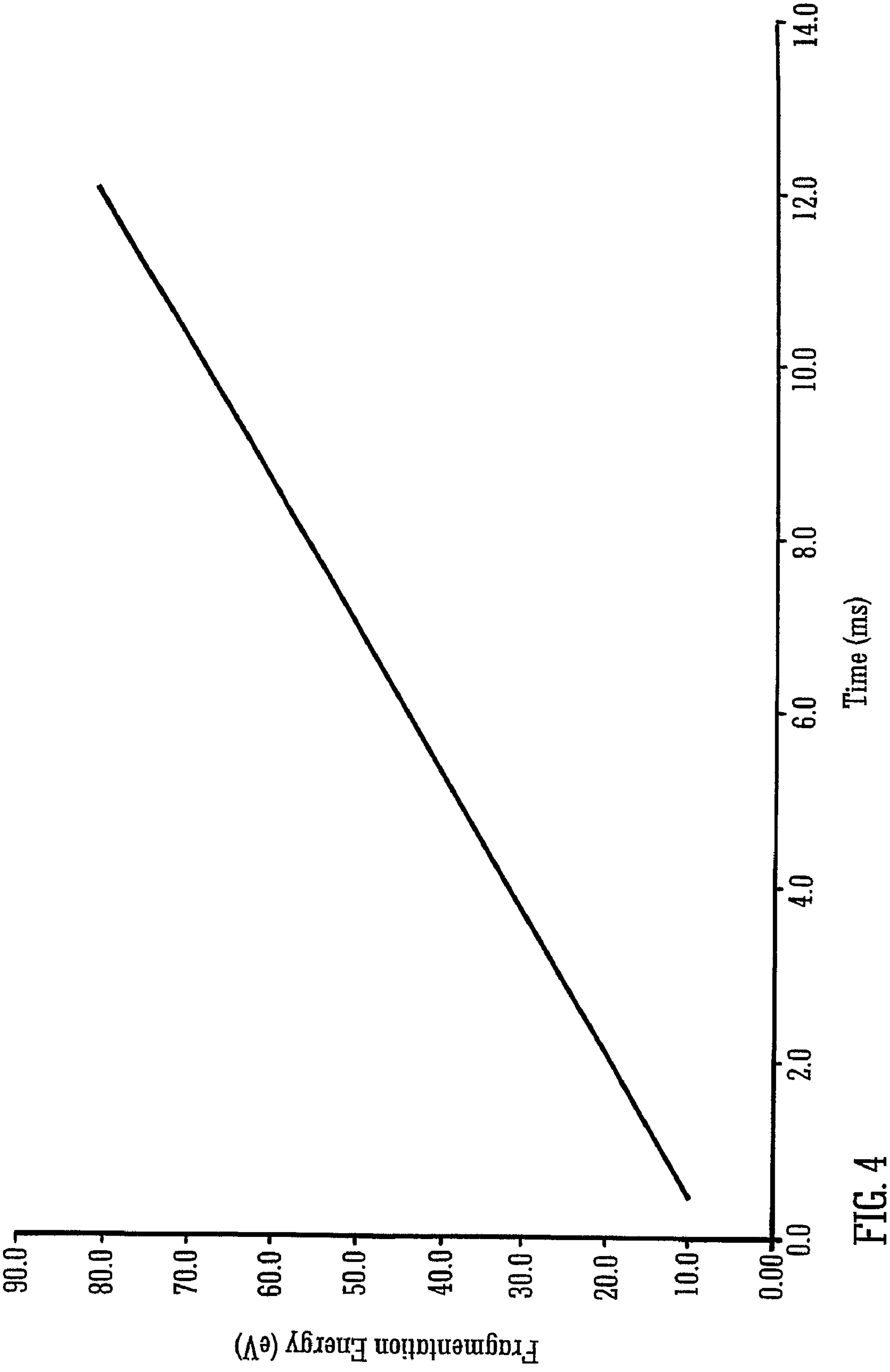
FIG. 4 shows a plot of the optimum energy for fragmentation which ions should possess against the time taken for singly charged ions to drift through an ion mobility spectrometer or separator according to the preferred embodiment.

The data and relationships shown in FIGS. 2 and 3 can be used to calculate the optimal energy which ions emerging from the ion mobility spectrometer or separator 3 and about to enter the fragmentation device 5 should be arranged to possess as a function of time in order to optimise the fragmentation of ions. The optimum fragmentation energy varies as function of mass to charge ratio of the ions. Since the mass to charge ratio of ions emerging from the ion mobility spectrometer or separator 3 at any point in time will be generally known, then the relationship between the optimum fragmentation energy and the time since a packet or pulse of ions is admitted into the ion mobility spectrometer or separator 3 can be determined. FIG. 4 shows a graph of how the fragmentation energy of the ions should preferably be arranged to vary as a function of time according to a preferred embodiment.

According to the preferred embodiment as parent or precursor ions emerge from the ion mobility spectrometer or separator 3 and subsequently pass to the fragmentation device 5 they are preferably accelerated through a potential difference such that they will then be fragmented within the fragmentation device 5 in a substantially optimal manner. Resulting fragment or daughter ions created within the fragmentation device 5 are then preferably arranged to exit the fragmentation device 5. The fragment or daughter ions may be urged to leave the fragmentation device 5 by the application of a constant or time varying electric field being applied along the length of the fragmentation device 5. The fragment or daughter ions which emerge from the fragmentation device 5 then preferably pass through the third transfer optic 6 or ion guide and are then preferably mass analysed by, for example, an orthogonal acceleration Time of Flight mass analyser 7. However, according to other embodiments the ions may be mass analysed by alternative forms of mass analyser.

The preferred embodiment facilitates efficient and optimal fragmentation of parent or precursor ions over substantially the entire mass to charge ratio range of interest. The preferred embodiment therefore results in a significantly increased or improved fragment ion sensitivity and substantially reduced precursor or parent ion crossover into fragment ion mass spectra. The preferred embodiment therefore enables fragment ion mass spectra to be produced wherein substantially all the ions observed in the fragment ion mass spectra are actually fragment ions. This represents an important improvement over conventional approaches wherein parent ions may still be observed in what is supposed to be a fragment ion mass spectrum due to the fact that some parent or precursor ions are not optimally fragmented.

Although a MALDI ion source may be used other ion sources may be used including, for example, an Atmospheric Pressure Ionisation ("API") ion source and in particular an Electrospray ionisation ion source are equally preferred. Most conventional Atmospheric Pressure Ionisation ion sources and Electrospray ion sources in particular differ from MALDI ion sources in that they tend to generate parent or precursor ions which are multiply charged rather than singly charged. However, the preferred embodiment is equally applicable to arrangements wherein multiply charged ions are produced or generated by the ion source or wherein multiply charged ions are passed to the ion mobility spectrometer or separator 3.

According to the preferred embodiment if multiply charged ions are generated by the ion source, transmitted to the ion mobility spectrometer or separator 3 and then are passed to the fragmentation device 5 then the collision energy of the multiply charged ions is preferably increased in proportion to the number of charges relative to singly charged ions being accelerated through the same potential difference. For example, considering ions having the same mass to charge ratio, then if for example the optimum collision energy of a singly charged ion is 10 eV then the collision energy for a doubly charged ion is set at 20 eV and the collision energy for a triply charged ion is set at 30 eV etc.

As will be appreciated by those skilled in the art, the exact correspondence between optimal fragmentation energy as a function of drift time through the ion mobility spectrometer or separator 3 will vary slightly for multiply charged ions but the general principle of operation of the preferred embodiment of progressively increasing the energy of ions emerging from the ion mobility spectrometer or separator 3 as a function of time will remain substantially the same.

An exception to the preferred embodiment wherein the kinetic energy of ions emerging from the ion mobility spectrometer or separator is preferably increased with time is contemplated wherein the mass spectrometer switches from optimising the fragmentation of doubly (or multiply) charged ions to optimising the fragmentation of singly charged ions. For example, doubly (or multiply) charged ions will exit the ion mobility spectrometer or separator 3 before singly charged ions having the same mass to charge ratio. The doubly charged ions may, for example, be arranged to obtain a kinetic energy of 20 eV. When the mass spectrometer then switches to optimise the fragmentation of singly charged ions having the same mass to charge ratio, the singly charged ions may be arranged to obtain a kinetic energy of 10 eV.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising:

an ion mobility spectrometer or separator, said ion mobility spectrometer or separator being arranged and adapted to separate ions according to their ion mobility;

a fragmentation device; and acceleration means arranged and adapted to accelerate, into the fragmentation device, first ions emerging from said ion mobility spectrometer or separator at a time $t_1$ so that they obtain a first kinetic energy $E_1$ selected to cause fragmentation of substantially all of the first ions that enter the fragmentation device, and to accelerate, into the fragmentation device, second different ions emerging from said ion mobility spectrometer or separator at a second later time $t_2$ so that they obtain a second different kinetic energy $E_2$ selected to cause fragmentation of substantially all of the second ions that enter the fragmentation device.

2. A mass spectrometer as claimed in claim 1, wherein said acceleration means is arranged and adapted to alter and/or vary and/or scan the kinetic energy which ions obtain as they pass from said ion mobility spectrometer or separator to said fragmentation device.

3. A mass spectrometer as claimed in claim 2, wherein said acceleration means is arranged and adapted to alter and/or vary and/or scan the kinetic energy which ions obtain as they pass from said ion mobility spectrometer or separator to said fragmentation device in a substantially continuous and/or linear and/or progressive and/or regular manner.

4. A mass spectrometer as claimed in claim 2, wherein said acceleration means is arranged and adapted to alter and/or vary and/or scan the kinetic energy which ions obtain as they pass from said ion mobility spectrometer or separator to said fragmentation device in a substantially non-continuous and/or non-linear and/or stepped manner.

5. A mass spectrometer as claimed in claim 1, wherein $E_2 > E_1$.

6. A mass spectrometer as claimed in claim 1, wherein said acceleration means is arranged and adapted to progressively increase with time the kinetic energy which ions obtain as they are transmitted from said ion mobility spectrometer or separator to said fragmentation device.

7. A mass spectrometer comprising:

an ion mobility spectrometer or separator, said ion mobility spectrometer or separator being arranged and adapted to separate ions according to their ion mobility;

a fragmentation device; and acceleration means arranged and adapted to accelerate, into the fragmentation device, first ions emerging from said ion mobility spectrometer or separator at a time $t_1$ through a first potential difference $V_1$ selected to cause fragmentation of substantially all of the first ions that enter the fragmentation device, and to accelerate, into the fragmentation device, second different ions emerging from said ion mobility spectrometer or separator at a second later time $t_2$ through a second different potential difference $V_2$ selected to cause fragmentation of substantially all of the second ions that enter the fragmentation device.

8. A mass spectrometer as claimed in claim 7, wherein said acceleration means is arranged and adapted to alter and/or vary and/or scan the potential difference through which ions pass as they pass from said ion mobility spectrometer or separator to said fragmentation device.

9. A mass spectrometer as claimed in claim 8, wherein said acceleration means is arranged and adapted to alter and/or vary and/or scan the potential difference through which ions pass as they pass from said ion mobility spectrometer or separator to said fragmentation device in a substantially continuous and/or linear and/or progressive and/or regular manner.

10. A mass spectrometer as claimed in claim 8, wherein said acceleration means is arranged and adapted to alter and/or vary and/or scan the potential difference through which ions pass as they pass from said ion mobility spectrometer or separator to said fragmentation device in a substantially non-continuous and/or non-linear and/or stepped manner.

11. A mass spectrometer as claimed in claim 7, wherein $V_2 > V_1$.

12. A mass spectrometer as claimed in claim 7, wherein said acceleration means is arranged and adapted to progressively increase the potential difference through which ions pass as they are transmitted from said ion mobility spectrometer or separator to said fragmentation device.

13. A mass spectrometer as claimed in claim 7, wherein $V_2 < V_1$.

14. A mass spectrometer as claimed in claim 7, wherein said acceleration means is arranged and adapted to decrease the potential difference through which ions pass as they are transmitted from said ion mobility spectrometer or separator to said fragmentation device.

15. A mass spectrometer as claimed in claim 1, wherein said acceleration means is arranged and adapted to accelerate and/or decelerate ions into said fragmentation device.

16. A mass spectrometer as claimed in claim 1, wherein said ion mobility spectrometer or separator comprises a gas phase electrophoresis device.

17. A mass spectrometer as claimed in claim 1, wherein said ion mobility spectrometer or separator comprises a drift tube and one or more electrodes for maintaining an axial DC voltage gradient along at least a portion of said drift tube.

18. A mass spectrometer as claimed in claim 1, wherein said ion mobility spectrometer or separator comprises one or more multipole rod sets.

19. A mass spectrometer as claimed in claim 18, wherein said one or more multiple rod sets are axially segmented or comprise a plurality of axial segments.

20. A mass spectrometer as claimed in claim 1, wherein said ion mobility spectrometer or separator comprises a plurality of electrodes and wherein at least 5%, 10%, 15%, 20%, 25%, 30%, 35%, 40%, 45%, 50%, 55%, 60%, 65%, 70%, 75%, 80%, 85%, 90%, 95% or 100% of said electrodes of said ion mobility spectrometer or separator have apertures through which ions are transmitted in use.

21. A mass spectrometer as claimed in claim 1, wherein said ion mobility spectrometer or separator comprises a plurality of plate or mesh electrodes and wherein at least some of said plate or mesh electrodes are arranged generally in the plane in which ions travel in use.

22. A mass spectrometer as claimed in claim 1, further comprising transient DC voltage means arranged and adapted to apply one or more transient DC voltages or one or more transient DC voltage waveforms to electrodes forming said ion mobility spectrometer or separator in order to urge at least some ions along at least a portion of the axial length of said ion mobility spectrometer or separator.

23. A mass spectrometer as claimed in claim 1, further comprising AC or RF voltage means arranged and adapted to apply two or more phase shifted AC or RF voltages to electrodes forming said ion mobility spectrometer or separator in order to urge at least some ions along at least a portion of the axial length of said ion mobility spectrometer or separator.

24. A mass spectrometer as claimed in claim 1, wherein said ion mobility spectrometer or separator comprises a plurality of electrodes, said mass spectrometer further comprising AC or RF voltage means arranged and adapted to apply an AC or RF voltage to at least 5%, 10%, 20%, 30%, 40%, 50%, 60%, 70%, 80%, 90%, 95% or 100% of said plurality of electrodes of said ion mobility spectrometer or separator in order to confine ions radially within said ion mobility spectrometer or separator or about a central axis of said ion mobility spectrometer or separator.

25. A mass spectrometer as claimed in claim 1, further comprising means arranged and adapted to maintain at least a portion of said ion mobility spectrometer or separator at a pressure selected from the group consisting of: (i) >0.001 mbar; (ii) >0.01 mbar; (iii) >0.1 mbar; (iv) >1 mbar; (v) >10 mbar; (vi) >100 mbar; (vii) 0.001-100 mbar; (viii) 0.01-10 mbar; and (ix) 0.1-1 mbar.

26. A mass spectrometer as claimed in claim 1, further comprising an ion guide or transfer means arranged between said ion mobility spectrometer or separator and said fragmentation device in order to guide or transfer ions emerging from said ion mobility spectrometer or separator to or into said fragmentation device.

27. A mass spectrometer as claimed in claim 1, wherein said fragmentation device comprises a collision or fragmentation cell.

28. A mass spectrometer as claimed in claim 1, wherein said fragmentation device is arranged and adapted to fragment ions by Collisional Induced Dissociation ("CID") or by Surface Induced Dissociation ("SID").

29. A mass spectrometer as claimed in claim 1, wherein said fragmentation device comprises a multipole rod set.

30. A mass spectrometer as claimed in claim 29, wherein said multiple rod set is axially segmented.

31. A mass spectrometer as claimed in claim 1, wherein said fragmentation device comprises a plurality of electrodes and wherein at least 5%, 10%, 15%, 20%, 25%, 30%, 35%, 40%, 45%, 50%, 55%, 60%, 65%, 70%, 75%, 80%, 85%, 90%, 95% or 100% of said electrodes of said ion mobility spectrometer or separator have apertures through which ions are transmitted in use.

32. A mass spectrometer as claimed in claim 1, wherein said fragmentation device comprises a plurality of plate or mesh electrodes and wherein at least some of said plate or mesh electrodes are arranged generally in the plane in which ions travel in use.

33. A mass spectrometer as claimed in claim 1, further comprising transient DC voltage means arranged and adapted to apply one or more transient DC voltages or one or more transient DC voltage waveforms to electrodes forming said fragmentation device in order to urge at least some ions along at least a portion of the axial length of said fragmentation device.

34. A mass spectrometer as claimed in claim 1, further comprising AC or RF voltage means arranged and adapted to apply two or more phase shifted AC or RF voltages to electrodes forming said fragmentation device in order to urge at least some ions along at least a portion of the axial length of said fragmentation device.

35. A mass spectrometer as claimed in claim 1, wherein said fragmentation device comprises a plurality of electrodes, said mass spectrometer further comprising AC or RF voltage means arranged and adapted to apply and AC or RF voltage to at least 1%, 5%, 10%, 20%, 30%, 40%, 50%, 60%, 70%, 80%, 90%, 95% or 100% of said plurality of electrodes of said fragmentation device in order to confine ions radially within said fragmentation device or about a central axis of said fragmentation device.

36. A mass spectrometer as claimed in claim 1, further comprising means arranged and adapted to maintain at least a portion of said fragmentation device at a pressure selected from the group consisting of: (i) >0.0001 mbar; (ii) >0.001 mbar; (iii) >0.01 mbar; (iv) >0.1 mbar; (v) >1 mbar; (vi) >10 mbar; (vii) 0.0001-01 mbar; and (viii) 0.001-0.01 mbar.

37. A mass spectrometer as claimed in claim 1, further comprising means arranged and adapted to trap ions upstream of said ion mobility spectrometer or separator and to pass or transmit a pulse of ions to said ion mobility spectrometer or separator in a mode of operation.

38. A mass spectrometer as claimed in claim 1, further comprising a control system arranged and adapted to switch or repeatedly switch said fragmentation device between a first mode of operation wherein ions are substantially fragmented and a second mode of operation wherein substantially less or no ions are fragmented.

39. A mass spectrometer as claimed in claim 38, wherein in said first mode of operation ions exiting said ion mobility spectrometer or separator are accelerated through a potential difference selected from the group consisting of: (i) ≧10 V; (ii) ≧20 V; (iii) ≧30 V; (iv) ≧40 V; (v) ≧50 V; (vi) ≧60 V; (vii) ≧70 V; (viii) ≧80 V; (ix) ≧90 V; (x) ≧100 V; (xi) ≧110 V; (xii) ≧120 V; (xiii) ≧130 V; (xiv) ≧140 V; (xv) ≧150 V; (xvi) ≧160 V; (xvii) ≧170 V; (xviii) ≧180 V; (xix) ≧190 V; and (xx) ≧200 V.

40. A mass spectrometer as claimed in claim 38, wherein in said second mode of operation ions exiting said ion mobility spectrometer or separator are accelerated through a potential difference selected from the group consisting of: (i) ≦20 V; (ii) ≦15 V; (iii) ≦10 V; (iv) ≦5 V; and (v) ≦1 V.

41. A mass spectrometer as claimed in claim 38, wherein said control system is arranged and adapted to switch said fragmentation device between said first mode of operation and said second mode of operation at least once every 1 ins, 5 ins, 10 ins, 15 ins, 20 ins, 25 ins, 30 ins, 35 ins, 40 ins, 45 ins, 50 ins, 55 ins, 60 ins, 65 ins, 70 ins, 75 ins, 80 ins, 85 ins, 90 ins, 95 ins, 100 ins, 200 ins, 300 ins, 400 ins, 500 ins, 600 ins, 700 ins, 800 ins, 900 ins, 1 s, 2 s, 3 s, 4 s, 5 s, 6 s, 7 s, 8 s, 9 s or 10 s.

42. A mass spectrometer as claimed in claim 1, further comprising an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; and (xvii) an Atmospheric Pressure Matrix Assisted Laser Desorption Ionisation ion source.

43. A mass spectrometer as claimed in claim 1, further comprising a mass analyser arranged downstream of said fragmentation device, wherein said mass analyser is selected from the group consisting of: (i) a Fourier Transform ("FT") mass analyser; (ii) a Fourier Transform Ion Cyclotron Resonance ("FTICR") mass analyser; (iii) a Time of Flight ("TOF") mass analyser; (iv) an orthogonal acceleration Time of Flight ("oaTOF") mass analyser; (v) an axial acceleration Time of Flight mass analyser; (vi) a magnetic sector mass spectrometer; (vii) a Paul or 3D quadrupole mass analyser; (viii) a 2D or linear quadrupole mass analyser; (ix) a Penning trap mass analyser; (x) an ion trap mass analyser; (xi) a Fourier Transform orbitrap; (xii) an electrostatic Fourier Transform mass spectrometer; and (xiii) a quadrupole mass analyser.

44. A mass spectrometer as claimed in claim 1, further comprising one or more mass or mass to charge ratio filters and/or analysers arranged upstream of said ion mobility spectrometer or separator, wherein said one or more mass or mass to charge ratio filters and/or analysers are selected from the group consisting of: (i) a quadrupole mass filter or analyser; (ii) a Wien filter; (iii) a magnetic sector mass filter or analyser; (iv) a velocity filter; and (v) an ion gate.

45. A method of mass spectrometry comprising:

separating ions according to their ion mobility in an ion mobility spectrometer or separator;

accelerating, towards a fragmentation device, first ions emerging from said ion mobility spectrometer or separator at a time $t_1$ so that they obtain a first kinetic energy $E_1$ selected to cause fragmentation of substantially all of the first ions that enter the fragmentation device;

accelerating, towards the fragmentation device, second different ions emerging from said ion mobility spectrometer or separator at a second later time $t_2$ so that they obtain a second different kinetic energy $E_2$ selected to cause fragmentation of substantially all of the second ions that enter the fragmentation device;

and fragmenting substantially all of said first and second ions in the fragmentation device.

46. A method of mass spectrometry comprising:

separating ions according to their ion mobility in an ion mobility spectrometer or separator;

accelerating, towards a fragmentation device, first ions emerging from said ion mobility spectrometer or separator at a time $t_1$ through a first potential difference $V_1$ selected to cause fragmentation of substantially all of the first ions that enter the fragmentation device;

accelerating, towards the fragmentation device, second different ions emerging from said ion mobility spectrometer or separator at a second later time $t_2$ through a second different potential difference $V_2$ selected to cause fragmentation of substantially all of the second ions that enter the fragmentation device; and fragmenting substantially all of said first and second ions in the fragmentation device.

* * * * *